United States Patent [19]

Ishimatsu

[11] Patent Number: 5,488,605
[45] Date of Patent: Jan. 30, 1996

[54] DISC CARTRIDGE WITH EASILY ASSEMBLED SLIDER AND SHUTTER MEANS

[75] Inventor: Yoshikazu Ishimatsu, Kanagawa, Japan

[73] Assignee: Sony Corporation, Tokyo, Japan

[21] Appl. No.: 440,002

[22] Filed: May 12, 1995

Related U.S. Application Data

[63] Continuation of Ser. No. 201,259, Feb. 24, 1994, abandoned.

[30] Foreign Application Priority Data

Feb. 25, 1993 [JP] Japan .................................. 5-059381

[51] Int. Cl.$^6$ ................................................. G11B 23/03
[52] U.S. Cl. ................................... 369/291; 360/133
[58] Field of Search ..................................... 206/444, 309; 360/133; 369/291

[56] References Cited

U.S. PATENT DOCUMENTS 4,746,013  5/1988  Suzuki et al. ........................ 206/309
5,050,030  9/1991  Nemoto et al. ...................... 360/133
5,065,391  11/1991  Funaki ................................ 369/291
5,119,358  6/1992  Soga .................................. 369/77.2

FOREIGN PATENT DOCUMENTS

0137965A2  4/1985  European Pat. Off. .
0250111A2  12/1987  European Pat. Off. .
0260898A2  3/1988  European Pat. Off. .

Primary Examiner—Robert S. Tupper
Assistant Examiner—William J. Klimowicz
Attorney, Agent, or Firm—Limbach & Limbach

[57] ABSTRACT

A disc cartridge that requires no metal guide member and therefore can be easily assembled. With conventional disc cartridges, the metal guide member made of a stainless sheet or the like must be inserted in the case, requiring a number of parts and assembly processes. In addition, the expensive metal guide member makes the final product extremely costly. Especially, an assembly process for assembly the guide member into the case by putting the guide member through the guide slider and the pair of sliders is difficult to automate, thereby reducing productivity. Further, there is a problem that the compression coil spring locked between the sliders is easily detached during assembly process.

10 Claims, 14 Drawing Sheets

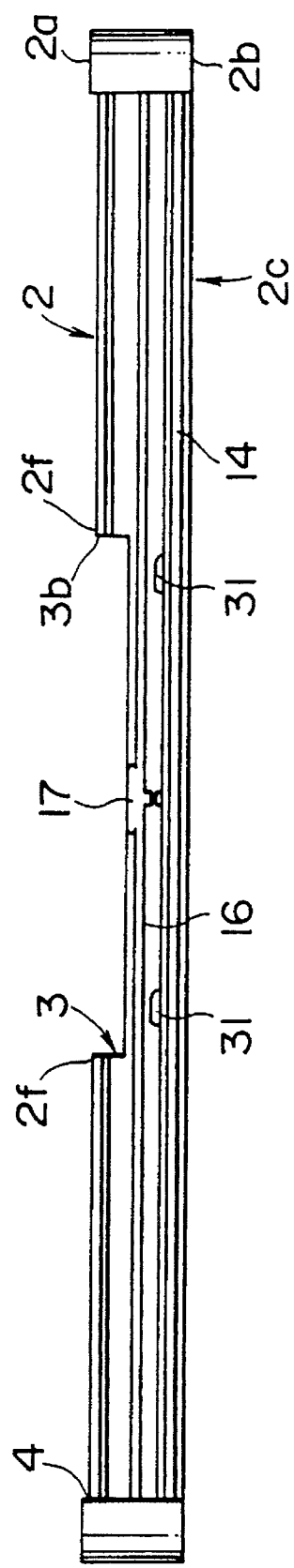
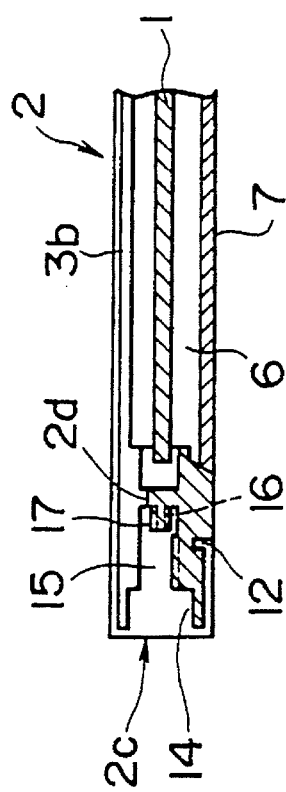
FIG. 7(A)
FIG. 7(B)

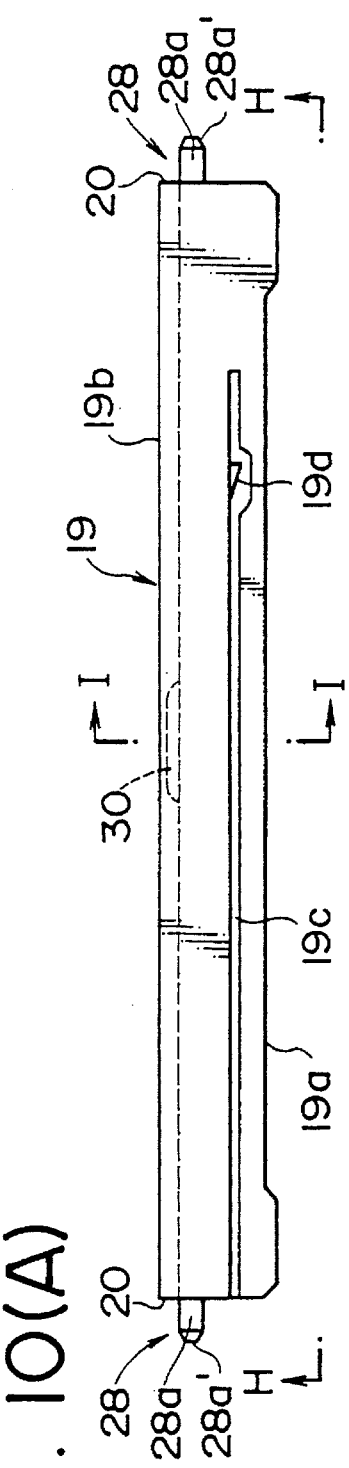
F I G. 10(A)
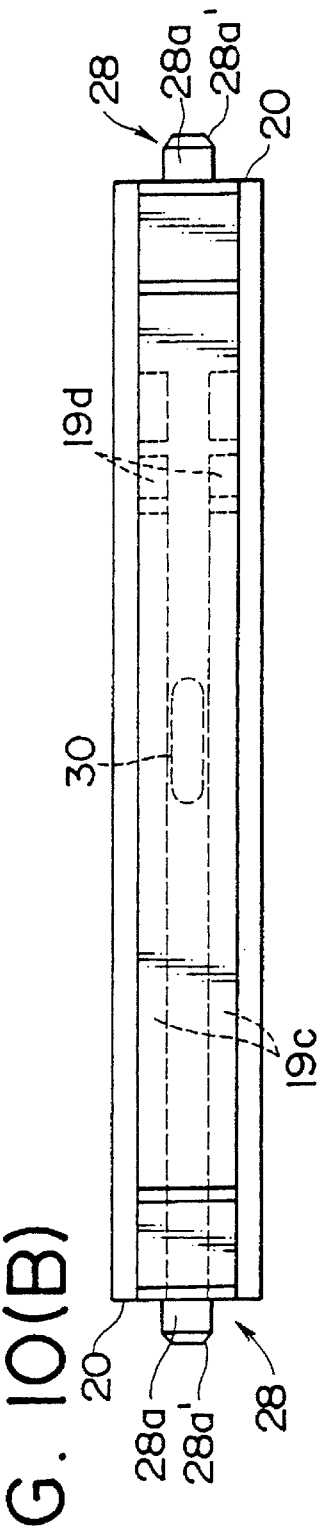
F I G. 10(B)
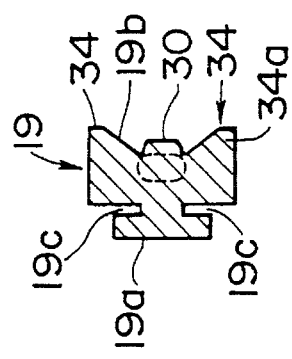
F I G. 10(C)

DISC CARTRIDGE WITH EASILY ASSEMBLED SLIDER AND SHUTTER MEANS

This is a continuation of application Ser. No. 08/201,259 filed on Feb. 24, 1994, now abandonded.

BACKGROUND OF THE INVENTION

1. Field of the Invention

The present invention relates to a cartridge suitable for accommodating a disc-shaped recording medium such as a CD-ROM for example and, more particularly, to a cartridge having a shutter slidably provided on both sides of an opening formed on one side of a casing of the cartridge to open and close the opening.

2. Description of the Related Art

As disclosed in U.S. Pat. No. 4,746,013 for example, a conventional disc cartridge for accommodating a disc-shaped recording medium such as a CD-ROM is composed of a disc-accommodating case formed with an opening at one side, a shutter slidably attached along one end of the case and between both ends of the opening to open and close it, and a compression coil spring for forcibly returning the shutter to a center position of the opening.

With such a conventional disc cartridge, a metal guide member made of a stainless sheet for example is assembled into one end of the case in parallel with a shutter sliding direction. A guide slider linked with the shutter and a pair of sliders are slidably inserted in the guide member. The two sliders are pulled to each other by means of a compression coil spring attached between ends of the sliders. Thus, the two sliders are abutted against both ends of the guide slider to forcibly return the shutter to the center of the above-mentioned opening.

By selectively sliding the shutter in one direction or another of the above-mentioned opening, one of the above-mentioned two sliders is selectively slid along the guide member against the force of the compression coil spring when opening the above-mentioned opening. It should be noted that a disc cartridge of the above-mentioned type is-used on a disc drive as disclosed in U.S. Pat. No. 5,119,358 for example.

OBJECTS AND SUMMARY OF THE INVENTION

However, with conventional disc cartridges of the above-mentioned type, the metal guide member made of a stainless sheet or the like must be inserted in the case, requiring a number of parts and assembly processes. In addition, the expensive metal guide member makes the final product extremely costly. Especially, an assembly process for assembling the guide member into the case by putting the guide member through the guide slider and the pair of sliders is difficult to automate, thereby reducing productivity. Further, there is a problem that the compression coil spring locked between the sliders is easily detached during assembly process.

It is therefore an object of the present invention to solve the above-mentioned problems by providing a cartridge that requires no metal guide member and therefore is easily assembled.

The above and other objects, features and advantages of the present invention will become more apparent from the following detail description when read in conjugation with the accompanying drawings, in which like reference numerals are used to identify the same or similar parts in several views.

BRIEF DESCRIPTION OF THE DRAWINGS

FIG. 7, (A) is a side view taken substantially along line C—C of FIG. 6 and FIG. 7, (B) is a sectional view taken substantially along line D—D of FIG. 6;

FIG. 10, (A) is a top view of the guide slider, FIG. 10, (B) is a side view taken substantially long line H—H of FIG. 10, (A), and FIG. 10, (C) is a sectional view taken substantially along line I—I of FIG. 10, (A);

DESCRIPTION OF THE PREFERRED EMBODIMENTS

A disc cartridge practiced as a preferred embodiment of this invention will be described by referring to the accompanying drawings.

Figure 13A:
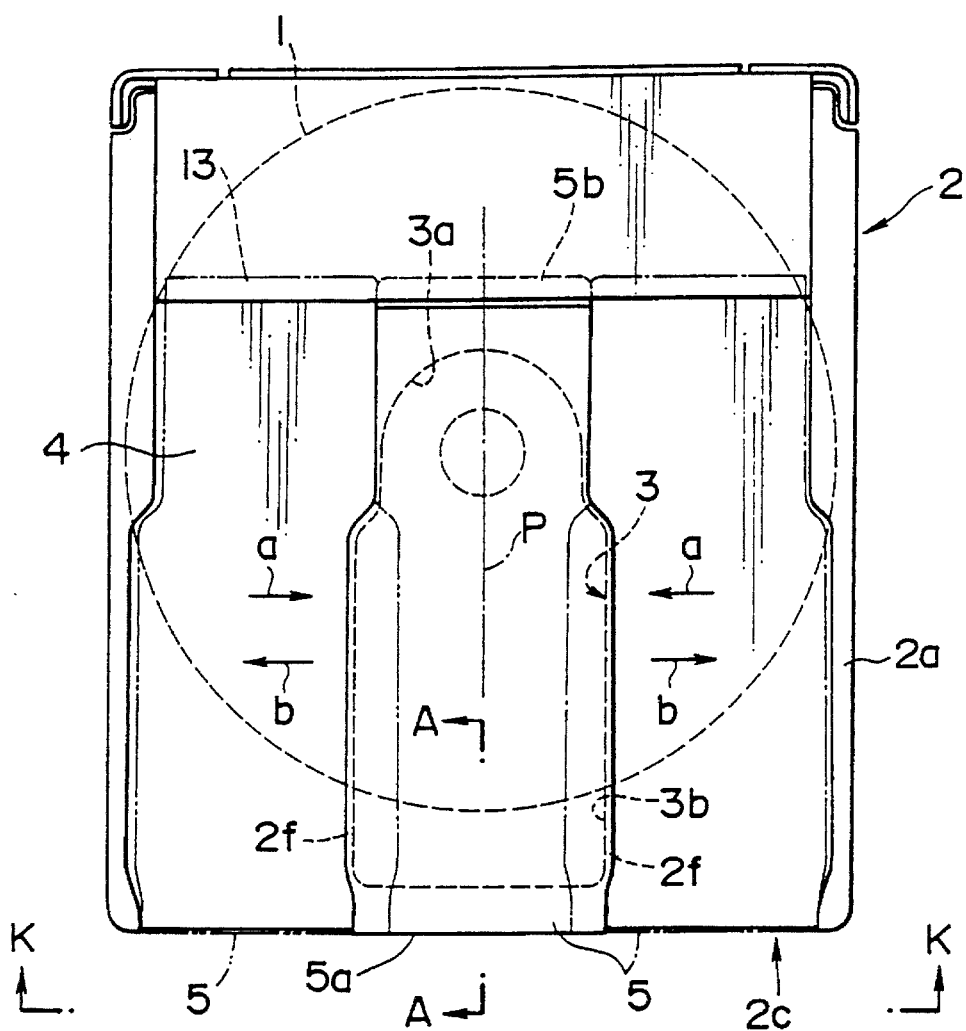
FIG. 13, (A) is a bottom view of the entire disc cartridge and FIG. 13, (B) is a side view taken substantially along line K—K of FIG. 13, (A)
Figure 13B:
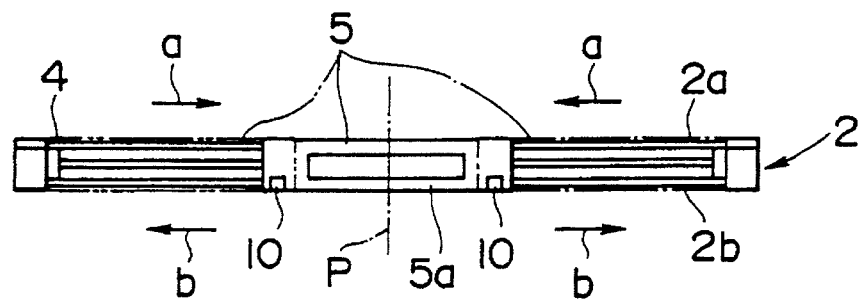

Description of the disc cartridge in its entirety:

First, the disc cartridge will be described in its entirety by referring to FIG. 13 and FIG. 14.

A disc-shaped recording medium 1 such as a CD-ROM composed of an optical disc is rotatively accommodated in a casing 2. A hole 1a is formed at the center of the disc-shaped recording medium 1. The casing 2 is formed into a flat, rectangular box made of synthetic resin for example.

The casing 2 has an upper and a lower side. An opening 3 is formed on the lower side 2a. The opening 3 is continuously formed by both a circular opening 3a provided at the center of the casing 2 facing the center hole 1a and a rectangular opening 3b extending from the hole 3a toward the center of an end 2c of the casing 2. The circular opening 3a and the rectangular opening 3b accommodate a disc deck's disc table, not shown, and optical pickup, not shown, respectively.

A recess 4 is formed on the lower surface 2a of the casing 2. In the recess 4, a shutter 5 is disposed so that it slides in directions indicated by arrows a and b to open or close the opening 3. The shutter 5, made of a stainless sheet for example, has a generally rectangular shape. Referring to FIG. 13, (A) and (B), the shutter 5 is disposed so that it slides in the directions indicated by the arrows a and b between a closed position, indicated by solid lines, on a center position P of the opening 3 and an open position, indicated by lines composed of alternating long dashes and single dots on the right side and lines composed of alternating long dashes and double dots on the left side.

Figure 14A:
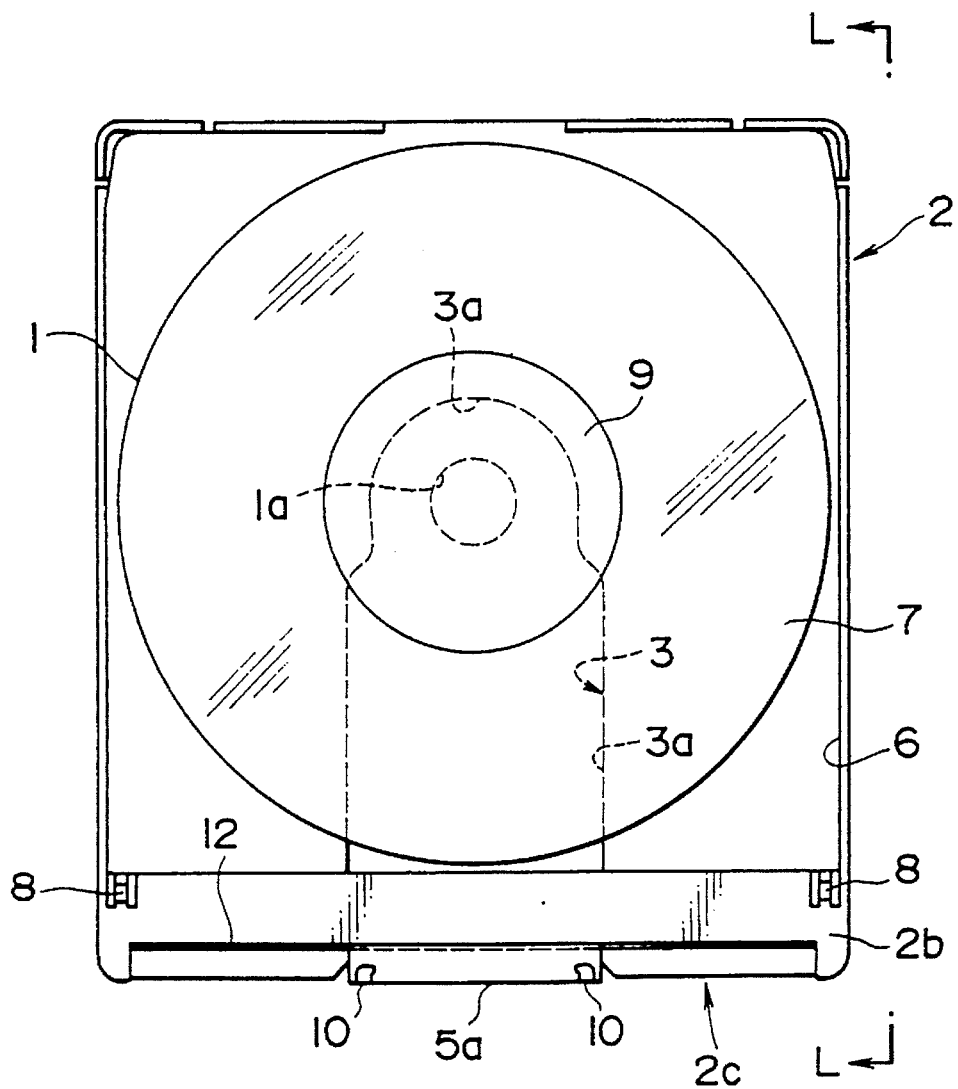
FIG. 14, (A) is a top view of the entire disc cartridge and FIG. 14, (B) is a side view taken substantially along line L—L of FIG. 14, (B).
Figure 14B:
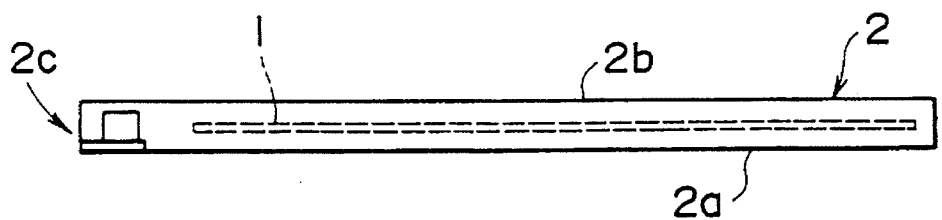

Referring to FIG. 14, (A), a generally square opening 6 is formed generally entirely over the upper surface 2b of the casing 2 except for a part of the end 2c. A transparent plate 7 is pivotally disposed on the casing 2 by means of a pair of rocking pins 8 disposed on the right and left sides to open or close the opening 6. The transparent plate 7, made of transparent synthetic resin, has a disc-shaped disc clamper 9 on its center. The transparent plate 7 is pivotally opened to expose the opening 6, thereby providing access to the disc-shaped recording medium 1 in the casing 2.

A short end 5a of the shutter 5 goes from the lower surface 2a of the casing, around the end 2c to the upper surface 2b in a generally "C" shape, and is slidably engaged in a guide groove 12 provided on the upper surface 2b, the guide groove 12 being guiding means parallel to the shutter sliding directions (indicated by the arrows a and b). Another short end 5b of the shutter 5 is slidably engaged in a guide slit 13 provided on a part of the upper surface 2a of the casing 2 in parallel with the shutter sliding directions (indicated by the arrows a and b).

Consequently, the shutter 5 is guided by the guide groove 12 and the guide slit 13 at both the short ends 5a and 5b to be slid in the recess 4 in the a and b directions. It should be noted that the end 5a of the shutter 5 is formed with a pair of shutter open/close arm engagement holes 10 on the right and left sides.

Description of the casing:

The casing 2 will be described in a construction associated with the shutter 5 by referring to FIGS. 1, 2, 5, 6 and 7.

Figure 6:
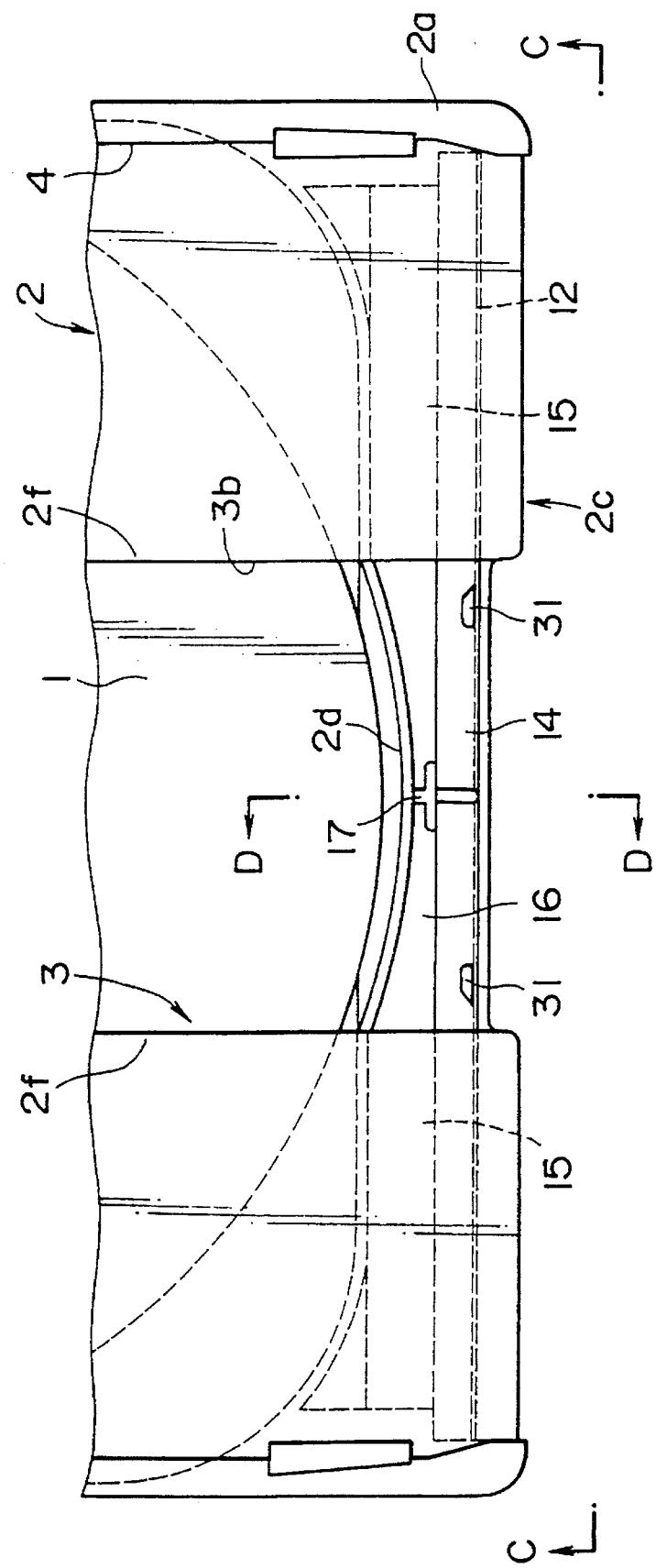
FIG. 6 is a top view illustrating one end of the casing.

The end 2c of the casing 2 is internally formed with a first groove-like portion 14 and a second groove-like portion 15. The second groove-like portion 15 is formed beyond the first groove-like portion 14 continuously. Both the groove-like portions are formed in parallel with the shutter sliding directions (indicated by the arrows a and b). The casing 2 is internally and integrally formed with a guide rib 16 disposed along the center of the second groove-like portion 15, in parallel with the upper and lower surfaces 2a and 2b of the casing 2, and in parallel with the shutter sliding directions. Referring to FIG. 6, it should be noted that this guide rib 16 is integrally formed on a portion of an outer peripheral wall 2d for the disc-shaped recording medium at the center of the wall's height. The wall 2d is also internally and integrally formed on the casing 2. A pair of upper and lower center stoppers 17 is integrally formed on the guide rib 16 at its upper and lower sides at a center P of the opening 3. A pair of projections 29a constituting a second engagement portion 29 is integrally formed thereon at the right and left sides of the above-mentioned pair of center stoppers 17.

Figure 8A:
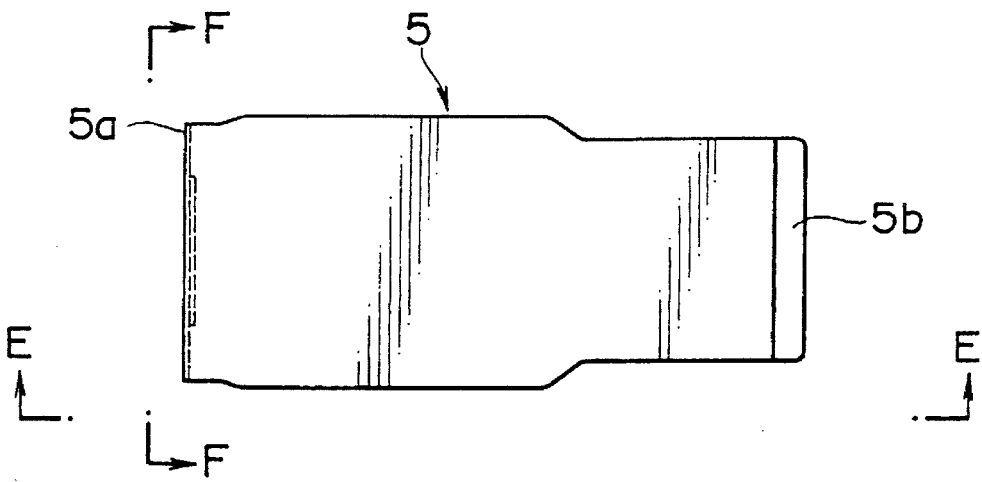
FIG. 8, (A) is a top view of the shutter, FIG. 8, (B) is a side view taken substantially along line E—E of FIG. 8, (A), and FIG. 8, (C) is a side view taken substantially along line F—F of FIG. 8, (A).
Figure 8B:
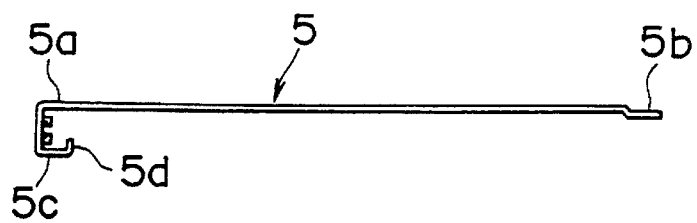
Figure 8C:
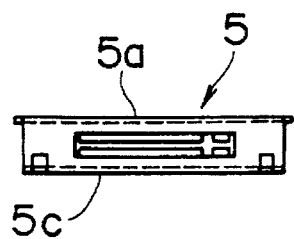

Description of the shutter:

The shutter 5 will be described by referring to FIGS. 1, 8 and 9.

The shutter 5, made of a material such as a stainless steel, has a generally band-like shape. One end 5a of the shutter 5 is integrally formed, along its entire breadth, with a "C"-shaped bend 5c. The bend 5c is integrally formed, on its tip at right and left sides, with a pair of guide pawls 5d at right angles to the bend 5c. Inside the bend 5c, a vertical pair of locking ribs 5e bent in generally "L" shape is integrally formed on the bend 5c in parallel with the shutter sliding directions. The locking ribs 5e are symmetrically disposed with their tips directed inside. A vertical pair of notches 5f is formed on the locking ribs 5e along parts of their lengths.

Description of guide slider:

A guide slider 19 will be described by referring to FIGS. 1, 2, 4 and 10.

Figure 9A:
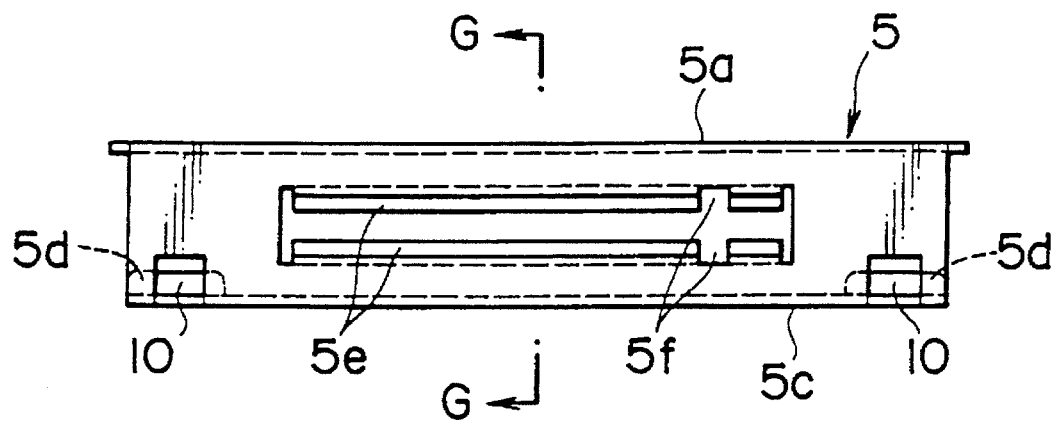
FIG. 9, (A) is an enlarged side view of FIG. 8, (C) and FIG. 9, (B) is a sectional view taken substantially along line G—G of FIG. 9, (A)
Figure 9B:
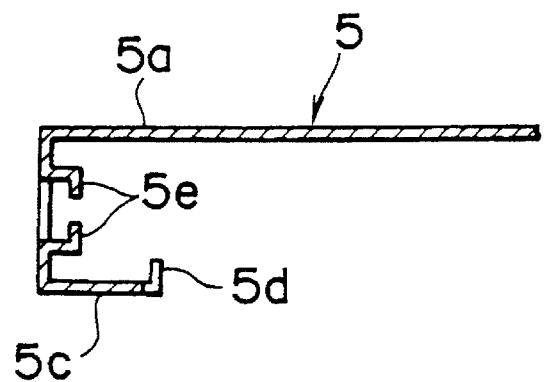
Figure 11A:
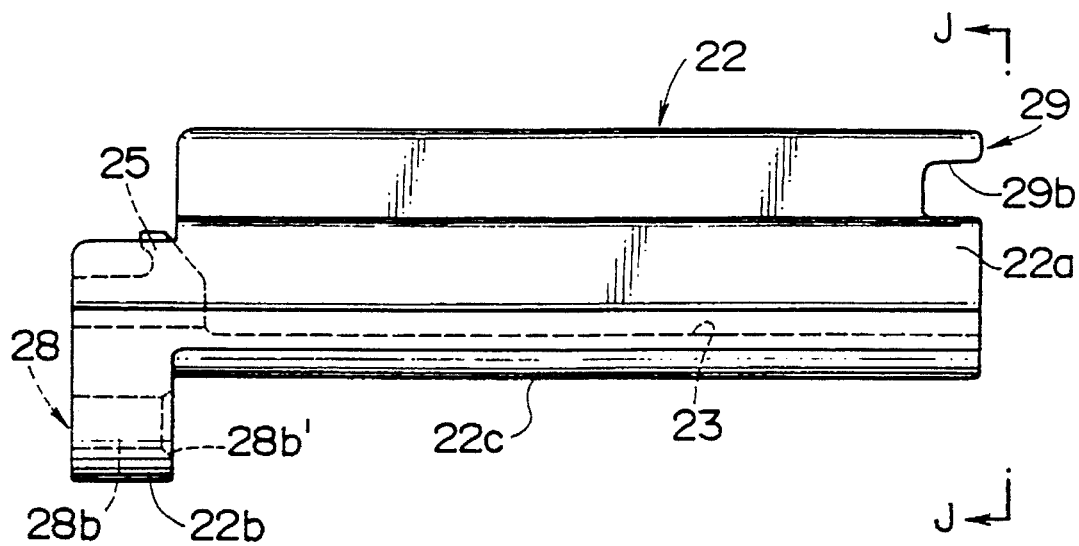
FIG. 11, (A) is a top view of the slider and FIG. 11, (B) is a side view taken substantially along line J—J of FIG. 11, (A)
Figure 11B:
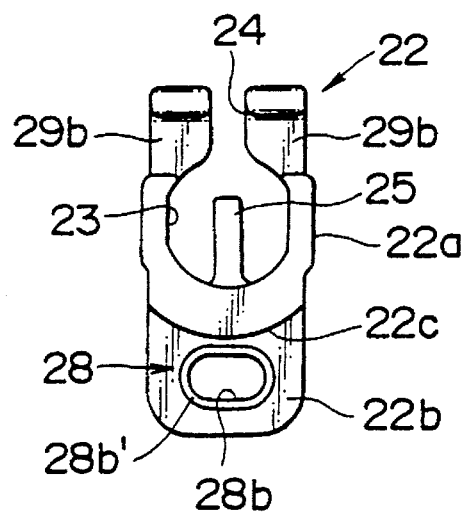

The guide slider 19, made of synthetic resin, is formed into a generally square bar whose length is approximately equal to the entire breadth (the horizontal width of FIG. 9, (A)) of the "C"-shaped bend 5c of the shutter 5. The guide slider 19 is formed with a vertical pair of slits 19c on the outside surface 19a from one end to a neighborhood of the other end of the guide slider 19. The pair of slits 19c is integrally formed with a pair of locking pawls 19d in a neighborhood of closed ends thereof. An inside surface 19b of the guide slider 19 is formed into a generally "U"-shaped groove. The guide slider 19 is also formed with a horizontal pair of both-sided stoppers 20 at right and left ends thereof. The pair of both-sided stoppers 20 is integrally formed with a horizontal pair of projections 28a that constitutes a horizontal pair of first engagement portions 28. These projections 28a are each formed into a tapered surface 28a' at a tip thereof. The inside surface 19b of the guide slider 19 is integrally formed with a bulging guide portion 30 at the center along its length.

Description of sliders:

A horizontal pair of sliders 22 will be described by referring to FIGS. 1, 2, 4, 5 and 11.

These sliders 22, made of synthetic resin, are each formed into a horizontally symmetrical, generally cylindrical shape. Each slider 22 is internally formed with a cylindrical hollow portion 23 running along its length. The hollow portion 23 is internally formed with a slit 24 along its length. The sliders 22 are formed with a vertical pair of notches 29b inside ends 22a thereof facing an end of the other slider 22. The notches 29b constitute a second engagement portion 29. An end 22b of each slider 22, facing opposite to each other slider 22, projects from an arc-shaped side of the slider 22 at right angles to it. The projection of the end 22b is formed with an engagement hole 28b that constitutes the first engagement portion 28. The engagement hole 28b is formed with a tapered surface 28b' at an end facing the engagement hole 28b of the other slider 22. The pair of sliders 22 are also integrally formed with a horizontal pair of spring locks 25 in the hollow portions 23 at the ends 22b.

As shown in FIGS. 1, 2, 6 and 7, at locations near the horizontal ends of the opening 3, the second groove-like portion 15 of the casing 2 is integrally formed with a horizontal pair of guide projections 31 on an upper surface of an inner wall of the second groove-like portion 15.

Figure 1:
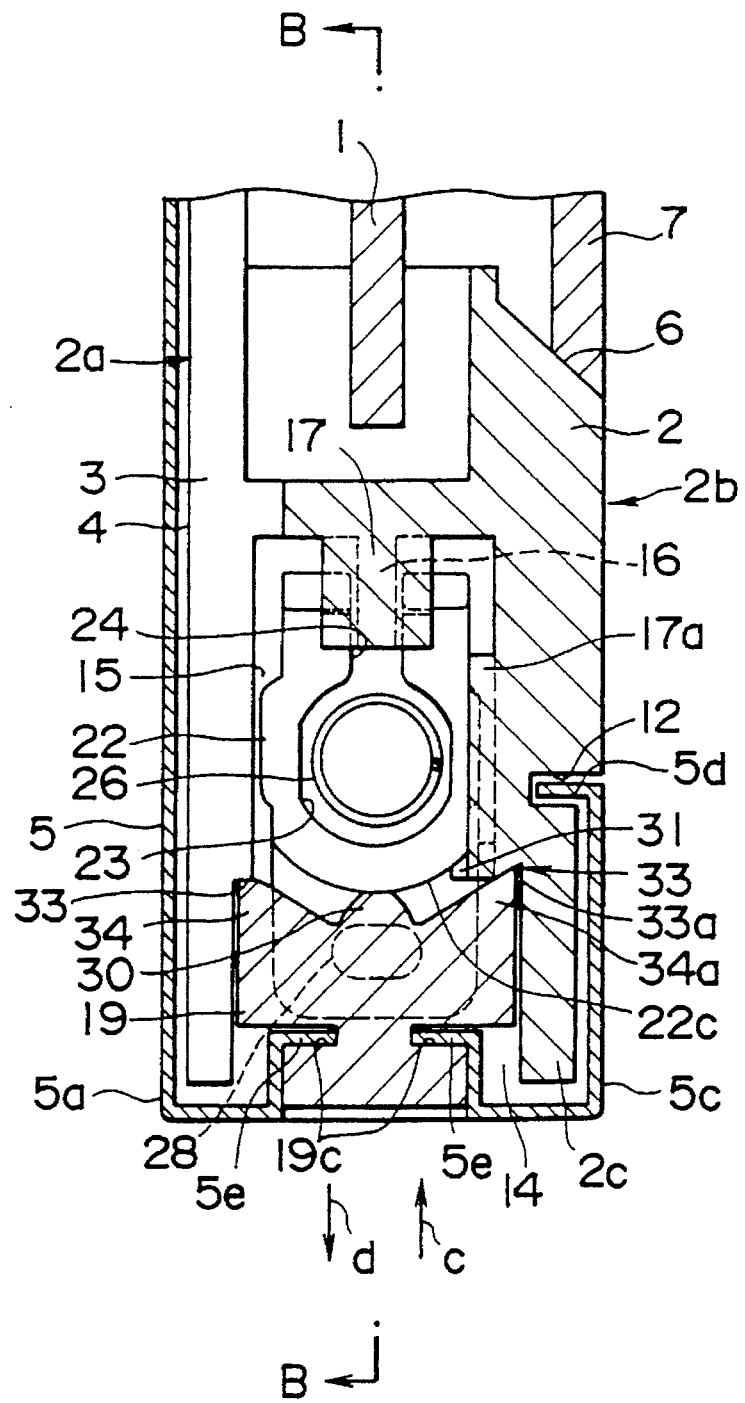
FIG. 1 is an enlarged sectional view taken substantially along line A—A of FIG. 13 and describes a main portion of the disc cartridge practiced as a preferred embodiment of the invention.

As shown in FIG. 1, the second groove-like portion 15 of the casing 2 is also integrally formed with an auxiliary center stopper 17a on the upper surface of the inner wall thereof at the center position P of the opening 3.

Also as shown in FIG. 1, a vertical width (shown horizontally in FIG. 1) of the first groove-like portion 14 disposed inside the end surface 2c of the casing 2 is larger than a width of the second groove-like portion 15. Between the first and second groove-like portions 14, 15, a vertical pair of stopping surfaces 33 is formed. The upper stopping surface 33 (on the upper surface 2b of the casing 2) is formed into a generally "V"-shaped stopper surface 33a in a direction indicated by an arrow c.

Assembling the shutter:

The shutter 5 is assembled as described below.

Figure 2:
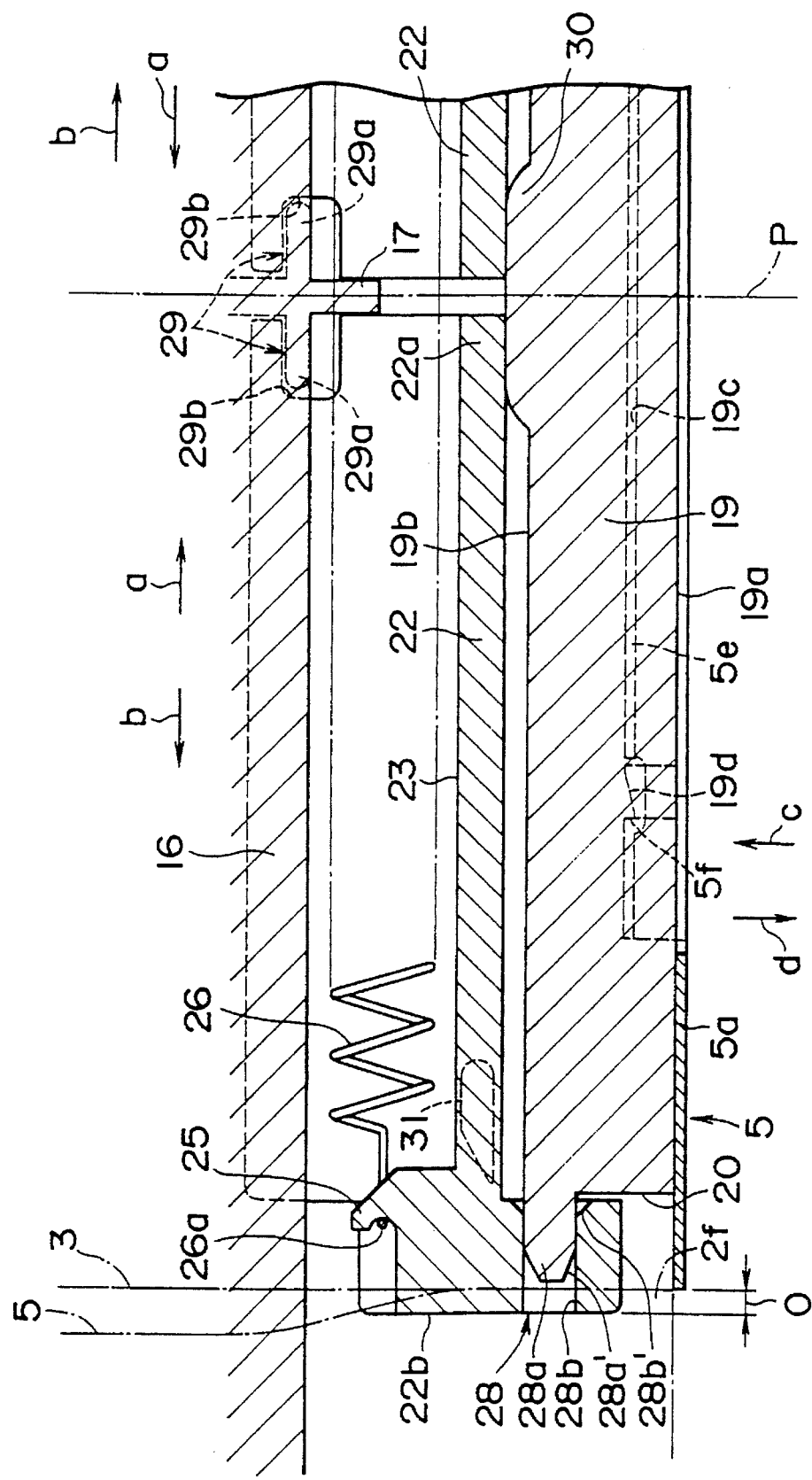
FIG. 2 is a sectional view taken substantially along line B—B of FIG. 1.

First, referring to FIGS. 1 and 2, attach the guide slider 19 inside the "C"-shaped bend 5c of the shutter 5 in parallel thereto. In doing so, press the vertical pair of slits 19c of the guide slider 19 into the vertical pair of locking ribs 5e of the "C"-shaped bend 5c along their lengths until the vertical pair of locking pawls 19d are locked with the vertical pair of notches 5f. Thus, the guide slider 19 can be attached into the "C"-shaped bend 5c in a single operation.

Figure 4:
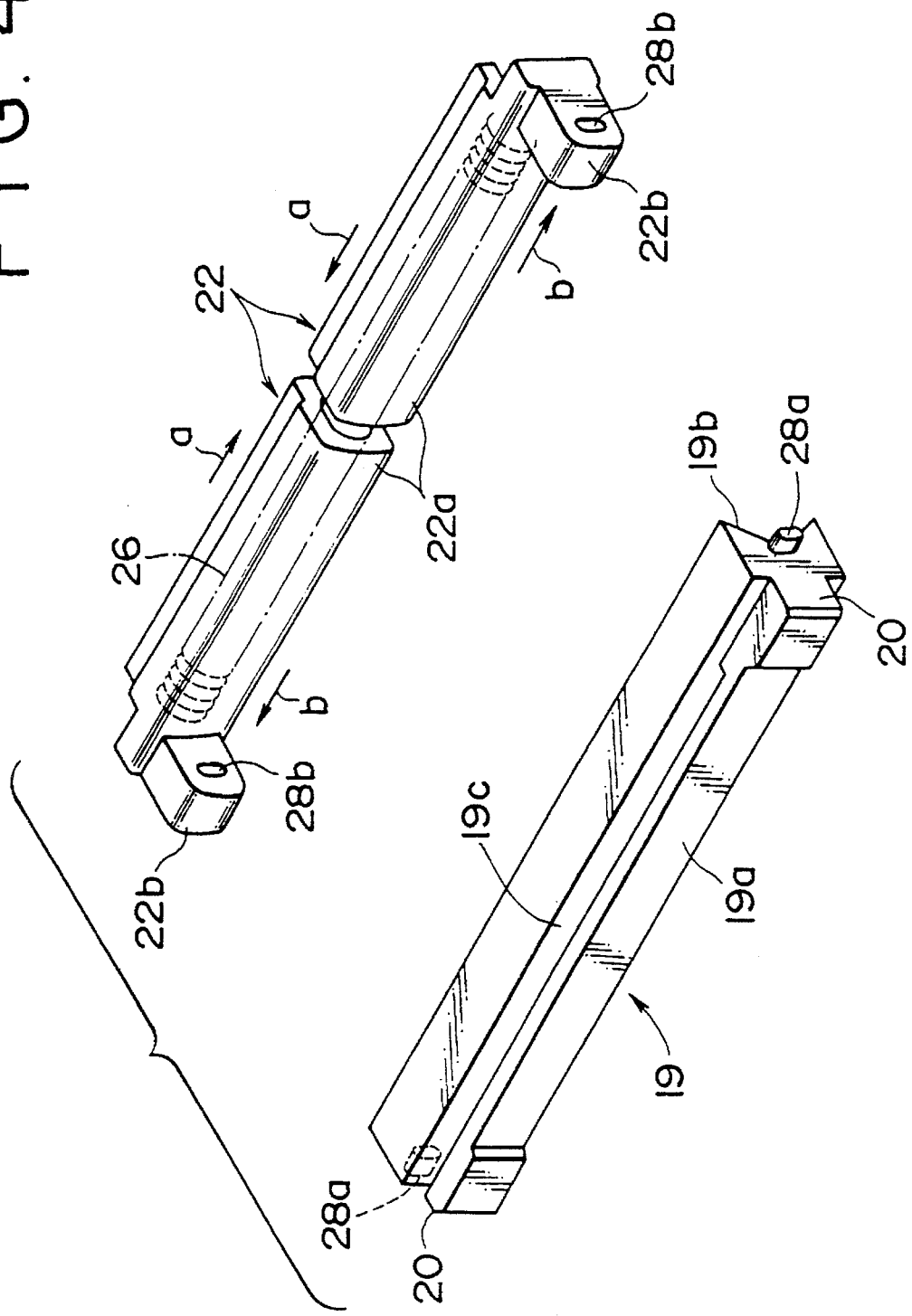
FIG. 4 is a perspective view of the guide slider, sliders, and the compression coil spring.
Figure 5:
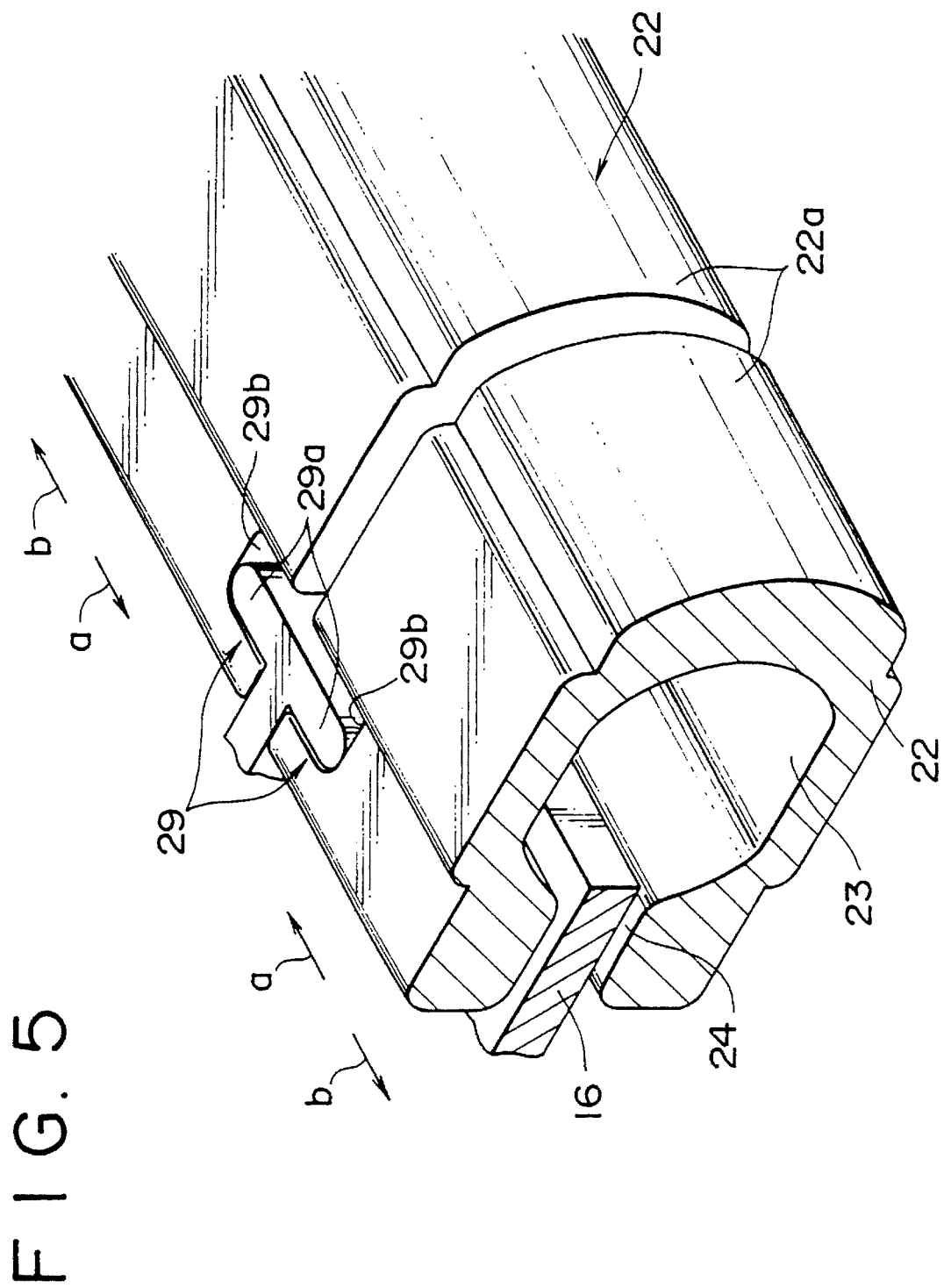
FIG. 5 is a perspective view of the sliders and the guide ribs.

Next, referring to FIGS. 1, 2 and 4, install a compression coil spring 26, means for force application, through the hollow portion 23 of the horizontal pair of sliders 22. Lock both ends 26a of the compression coil spring 26 with the pair of the spring locks 25 of the sliders 22. Then, the both sliders 22 are pulled by the spring 26 toward each other in the directions of the arrow a, with the ends 22a of the sliders 22 abutting against each other in the directions of the arrow a.

It should be noted that the compression coil spring 26 is stably held in the hollow portion 23 of the sliders 22 in the above-mentioned assembly, making it difficult for the spring 26 to be detached from the sliders 22.

Now, as shown in FIG. 4, pull the horizontal pair of the sliders 22 from each other against the force of the spring 26 in the directions of the arrow b and, as shown in FIGS. 1 and 2, engage the horizontal pair of engagement holes 28b of both the sliders 22 with the horizontal pair of projections 28a of the guide sliders 19 from the directions of arrows b. The compression coil spring 26 causes the end surfaces 22b of the horizontal pair of sliders 22 to be abutted against the horizontal pair of both-sided stoppers 20 of the guide sliders 19.

Thus, the horizontal pair of sliders 22 and the compression coil spring 26 are assembled inside the "C"-shaped bend 5 of the shutter 5 to be stably held.

Then, referring to FIGS. 1 and 2, insert the horizontal pair of sliders 22 and the guide sliders 19 from the end surface 2c of the casing 2 into the first and second groove-like portions 14, 15 in the direction of the arrow c. In doing so, slightly vertically open the "C"-shaped bend 5c of the shutter 5 against elasticity and set the bend 5c over the lower surface 2a of the casing 2 and the end surface 2c and around the upper surface 2b and into the guide groove 12. Insert the horizontal pair of the guide pawls 5d at the tip of the bend 5c into the guide groove 12 in a slidable manner.

Consequently, the horizontal pairs of sliders 22 and guide sliders 19 can be inserted in the first and second groove-like portions 14, 15 in the direction of the arrow c in a single operation, facilitating the assembling of the shutter 5 into the casing 2 to a great extent, thereby permitting automatic assembling.

It should be noted that, in inserting the horizontal pair of sliders 22 in the second groove-like portion 15 in the direction of the arrow c, the horizontal pair of guide projections 31 escapes outside against elasticity. When the sliders 22 have been inserted in the second guide groove 15 in the direction of the arrow c, the guide projections 31 are abutted against the arc-shaped outside surfaces 22c of the sliders 22.

As shown in FIG. 1, a vertical pair of abutting portions 34 formed on upper and lower ends of the "U"-shaped inside surface 19b of the guide slider 19 inserted in the first guide groove 14 in the direction of the arrow c are abutted against the vertical pair of stopper surfaces 33 in the casing 2. It should be noted that the upper abutting portion 34 of the guide slider 19 is also abutted against the "V"-shaped abutting portion 34a in accordance with the "V"-shaped stopper surface 33a, the upper stopper surface 33.

As shown in FIGS. 1 and 2, the horizontal pair of sliders 22 inserted in the second groove-like portion 15 in the direction of the arrow c are inserted in the upper and lower portions of the guide rib 16 in the direction of the arrow c by means of the slits 24 provided on the sliders 22.

Figures 3A, 3B, 3C:
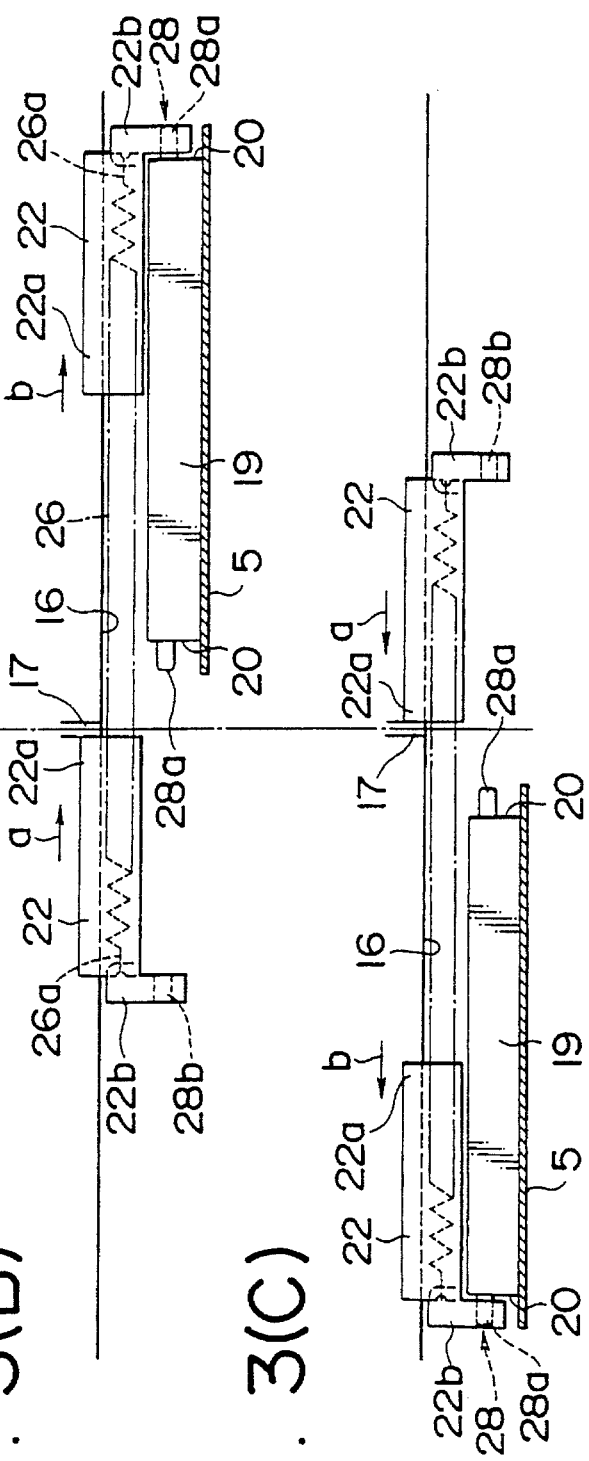
FIG. 3, (A), (B) and (C) are diagrams for describing an operation of the shutter which opens toward both sides of the center stopper.

When the shutter 5 has been assembled into the casing 2, the horizontal pair of sliders 22 are pulled to each other in the directions of the arrow a by means of the compression coil spring 26, abutting their ends 22a against the left and right sides of the center stopper 17 and the auxiliary center stopper 17a in the directions of the arrow a, as shown in FIGS. 2 and 3 (A).

By means of the force of the compression coil spring 26, the ends 22b of the horizontal pair of sliders 22 uniformly press the horizontal pair of both-sided stoppers 20 of the guide slider 19 in the direction of the arrow a, thereby positioning the shutter 5 to the center position P. Thus, the shutter 5 closes the opening 3 as indicated by solid lines in FIG. 13.

With the opening 3 closed, the ends 22b of the horizontal pair of sliders 22 overlap with the inside of right and left rims 2f of the opening 3 of the casing 2 by a certain amount indicated by "O" in FIG. 2.

Also, with the opening 3 closed, the notches 29b of the ends 22a of the horizontal pair of sliders 22 are engaged with the projections 29a on the left and right sides of the center stopper 17 in the direction of the arrow a as shown in FIG. 2.

As shown in FIGS. 1 and 2, the horizontal pair of both-sided stoppers 20 of the guide slider 19 is engaged with the ends 22b of the horizontal pair of sliders 22 by means of the projections 28a and engagement holes 28b of the horizontal pair of first engagement parts 28. The ends 22a of the horizontal pair of sliders 22 are engaged with the left and right sides of the center stopper 17 by means of the projections 29a and notches 29b of the horizontal pair of second engagement portions 29. The horizontal pair of guide projections 31 is engaged with the outside surfaces 22c of the horizontal pair of sliders 22.

The above-mentioned setup prevents the guide slider 19 and the horizontal pair of sliders 22 from inadvertently coming off the first and second groove-like portions 14, 15 of the casing 2 in an direction of the arrow d.

The overlap "O" between the end 22b of the horizontal pair of sliders 22 and the right and left side rims 2f of the opening 3 of the casing 2 prevents the horizontal pair of sliders 22 from being inadvertently pulled out toward the opening 3 (to the left in FIG. 1) of the casing 2.

As shown in FIG. 1, the horizontal pair of guide pawls of the shutter 5 is inserted in the guide groove 12 of the casing 2, preventing the shutter 5 from being inadvertently pulled out of the casing 2 in the direction of the arrow d.

As shown in FIG. 1 again, if an external pressure is applied to the "C"-shaped bend 5c of the shutter 5 in the direction of the arrow c, the vertical pair of abutting portions 34 of the guide slider 19 is abutted, in the direction of the arrow c, against the vertical pair of stopper surfaces 33 integrally formed on the inside wall of the casing 2. Thus, the stopper surfaces 33 securely support the applied external pressure.

Consequently, the above-mentioned setup prevents the guide slider 19 from being pushed by the external pressure in the direction of the arrow c deep into the second groove-like portion 15 of the casing 2 to vertically expand the casing 2, thereby destroying it. Thus, the casing 2 becomes highly durable.

Especially, since the upper stopper surface 33 and the abutting portion 34 are formed into the "V"-shaped stopper surface 33a and the "V"-shaped abutting portion 34a, the upper surface 2b of the casing 2 can be drawn toward the lower surface 2c by pushing the "V"-shaped abutting portion 34a into the "V"-shaped stopper surface 33a by means of wedge action, thereby preventing the upper surface 2b of the casing 2 from being inadvertently pushed open outside.

In the above-mentioned setup, as shown in FIG. 14, the upper surface 2b of the casing 2 is mostly opened by the opening 6 and therefore the upper surface 2b is lower than the lower surface 2a in strength, so that the above-mentioned effect provided by the "V"-shaped abutting portion 34a and the "V"-shaped stopper surface 33a is conspicuous.

Shutter opening and closing operations:

Opening and closing operations of the opening 3 by means of the shutter 5 will be described by referring to FIG. 3.

FIG. 3, (A) shows the opening 3 closed with the shutter 5 positioned at the center P of the opening 3.

FIG. 3, (B) shows the opening 3 opened as indicated by lines composed of alternating long dashes and single dots with the shutter 5 slid from the center P to the right in the direction of the arrow b.

As shown in FIG. 3, (B), with the left slider abutted against the center stopper 17 in the direction of the arrow a, the both-sided stopper 20 of the right side of the guide slider 19 presses the end 22b of the right slider 22 in the direction of the arrow b to slide the right slider 22 in the direction of the arrow b together with the guide slider 19, pulling the compression coil spring to the right, or in the direction of the arrow b.

FIG. 3, (C) shows the opening 3 opened as indicated by lines composed of alternating long dashes and double dots, with the shutter 5 slid from the center position P to the left in the direction of the arrow b.

In the above-mentioned state, as shown in FIG. 3, (C), with the right slider abutted against the center stopper 17 in the direction of the arrow a, the both-sided stopper 20 of the left side of the guide slider 19 presses the end 22b of the left slider 22 in the direction of the arrow b to slide the left slider 22 in the direction of the arrow b together with the guide slider 19, pulling the compression coil spring to the left, or in the direction of the arrow b.

As shown in FIG. 3, (B) and (C), it is apparent that the shutter 5 slid from the center position P of the opening 3 to the right or left side in the direction of the arrow b is returned to the center position P of the opening 3 in the direction of the arrow a shown in FIG. 3, (A) by the compression coil spring 26 which pulls the right and left sliders 22 to each other in the direction of the arrow a.

When the shutter 5 slides in the directions of the arrows a and b, the horizontal pair of sliders 22 is guided by the guide rib 16 inserted by the slit 24 can smoothly slide in the directions of arrows a and b. While these sliders 22 are sliding in the directions of the arrows a and b, the horizontal pair of guide projections 31 prevents the sliders 22 from being pulled out of the second groove-like portion 15 in the direction of the arrow d.

Referring to FIG. 2 and FIG. 3, (A), when the shutter 5 is returned to the center position P of the opening 3 in the direction of the arrow a, the horizontal pair of first and second engagement portions 28, 29 are engaged with the projection 28a with the engagement hole 28b and the projection 29a with the notch 29b.

In the above-mentioned setup, as shown in FIG. 2, the projection 28a and engagement hole 28b of the first engagement portion 28 are guided by the tapered surfaces 28a' and 28b' of these projection and hole to be smoothly engaged with each other. For the second engagement portion 29, the end 22a of each slider 22 is guided by the guide portion 30 of the guide slider 19 to be applied force in the direction of the arrow c, smoothly engaging the projection 29a with the notch 29b.

Figure 12:
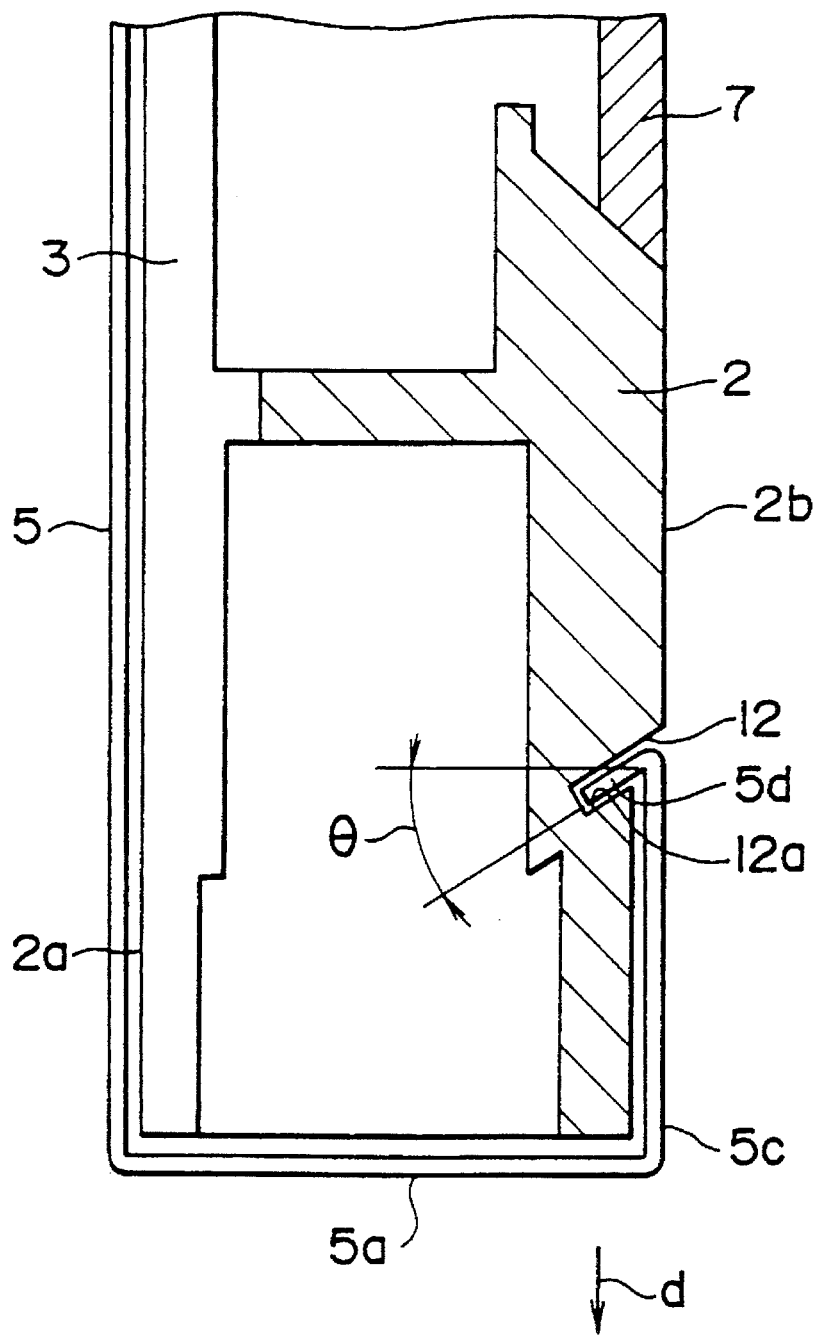
FIG. 12 is a sectional view illustrating a variation of the guide pawl of the shutter.

A variation to the guide pawl 5d of the shutter 5 will be described by referring to FIG. 12.

In this variation example, the horizontal pair of guide pawls 5d on top of the "C"-shaped bend 5c of the shutter 5 is bent at an acute angle θ and the side surface 12a of the guide groove 12 is also formed at the acute angle θ which is parallel to the guide pawls 5d.

According to the above-mentioned variation, a pulling force to be applied to the shutter 5 in the direction of the arrow d can be securely supported by the guide pawl 5d having the acute angle θ and the side surface 12a having the acute angle θ of the guide groove 12, preventing the shutter 5 from being detached out of the casing 2 in the direction of the arrow d.

While preferred embodiments of the invention have been described using specific terms, such description is for illustrative purposes only, and it is to be understood that changes and variations may be made without departing from the spirit or scope of the appended claims.

It is apparent that the present invention is applicable to cartridges of various types for accommodating encased recording media of various types.

What is claimed is:

1. A disc cartridge comprising:

a housing main body for rotatably housing therein a disc-shaped recording medium, the housing main body having an opening on at least one surface;

shutter means slidably connected to the housing main body for opening and closing the opening, the shutter means movable between a closed position that closes the opening and a first open position that at least partially opens the opening, and between the closed position and a second open position that at least partially opens the opening, the shutter means being positioned adjacent to a first side of the housing main body when in the first open position, the shutter means being positioned adjacent to a second side of the housing main body when in the second open position;

a first slider movable in a direction parallel to the movement of the shutter means, the first slider being entirely disposed within a region between a center of the opening and the first side of the housing main body when the opening is closed by the shutter means;

a second slider movable in the direction parallel to the movement of the shutter means, the second slider being entirely disposed within a region between the center of the opening and the second side of the housing main body when the opening is closed by the shutter means;

stopper means disposed between the first and second sliders for preventing movement of any portion of the first slider beyond the center of the opening towards the second side, and for preventing movement of any portion of the second slider beyond the center of the opening towards the first side;

force applying means for pressing the first and second sliders toward each other so that end portions of the sliders are abutted against the stopper means; and guide means connected to the shutter means for engaging the first and second sliders so that the guide means pushes the first slider towards the first side when the shutter means moves towards the first position, and so that the guide means pushes the second slider towards the second side when the shutter means moves towards the second position.

2. The disc cartridge according to claim 1, wherein the first slider has a first cavity continuously formed along its longitudinal axis, wherein the second slider has a second cavity continuously formed along its longitudinal axis, and wherein the force applying means includes a compression coil spring whose ends are engaged with external ends of the first and second sliders.

3. The disc cartridge according to claim 2 and further comprising a guide rib formed inside the housing main body in parallel with the direction of movement of the shutter means, wherein the first slider has a first slit formed along its longitudinal axis, and the second slider has a second slit formed along its longitudinal axis, and wherein the guide rib is inserted inside the first and second slits.

4. The disc cartridge according to claim 2 and further comprising a guide rib formed inside the housing main body in parallel with the direction of movement of the shutter means, wherein the first slider has a first slit formed along its longitudinal axis, the first slit opening the first cavity, and the second slider has a second slit formed along its longitudinal axis, the second slit opening the second cavity, wherein the guide rib is inserted inside the first and second slits.

5. A disc cartridge according to claim 2, wherein the force applying means is disposed within the first cavity of the first slider and the second cavity of the second slider.

6. The disc cartridge according to claim 1 wherein the housing main body includes a plurality of stopper surfaces to restrict a movement of the guide means into the housing main body towards the disc-shaped recording medium.

7. The disc cartridge according to claim 6, wherein the plurality of stopper surfaces are disposed on inner walls of an upper case and a lower case of the housing main body, at least one of the plurality of stopper surfaces being formed into generally a "V" shape.

8. The disc cartridge according to claim 1 and further comprising a cover pivotally secured on the housing main body, the cover moving between a closed position that covers the disc-shaped recording medium, and an open position that exposes the disc-shaped recording medium.

9. The disc cartridge according to claim 7, wherein the cover is composed of a transparent plate.

10. The disc cartridge according to claim 8, wherein the housing main body includes a first stopper surface and a second stopper surface respectively disposed on an inner wall of an upper case of the housing main body and an inner wall of a lower case of the housing main body to restrict a movement of the guide means into the housing main body towards the disc-shaped recording medium, the first stopper surface being formed into a generally "V" shape.

* * * * *

UNITED STATES PATENT AND TRADEMARK OFFICE
CERTIFICATE OF CORRECTION

PATENT NO. : 5,488,605

DATED : January 30, 1996

INVENTOR(S) : Yoshikazu Ishimatsu

It is certified that error appears in the above-identified patent and that said Letters Patent is hereby corrected as shown below:

In column 10, claim 9, line 24, "according to claim 7" should be changed to --according to claim 8--.

Signed and Sealed this

Seventh Day of May, 1996

Attest:

BRUCE LEHMAN

*Attesting Officer*   Commissioner of Patents and Trademarks